United States Patent [19]

Tsuge et al.

[11] 4,258,934
[45] Mar. 31, 1981

[54] SEAT BELT TENSIONING DEVICE

[75] Inventors: Noboru Tsuge, Kariya; Satosi Kuwakado, Aichi; Toshihiro Takei; Toshiaki Shimokawa, both of Okazaki, all of Japan

[73] Assignee: Nippon Soken, Inc., Nishio, Japan

[21] Appl. No.: 37,215

[22] Filed: May 8, 1979

[30] Foreign Application Priority Data

May 23, 1978 [JP] Japan .................................. 53/61282

[51] Int. Cl.³ .............................................. B60R 21/10
[52] U.S. Cl. .................................. 280/806; 188/1 C; 280/805; 297/472; 297/480
[58] Field of Search .................. 280/805, 806 SS; 180/268; 297/480, 470, 471, 472; 188/1 C; 60/632, 635, 638

[56] References Cited

U.S. PATENT DOCUMENTS

| 3,547,468 | 12/1970 | Giuffrida | 280/805 |
|---|---|---|---|
| 3,561,690 | 2/1971 | Muskat | 280/805 |
| 3,680,913 | 8/1972 | Seybold | 297/472 |
| 3,741,494 | 6/1973 | Fiala | 297/471 |
| 3,765,700 | 10/1973 | Littmann | 280/805 |
| 3,937,487 | 2/1976 | Pech | 280/805 |
| 3,999,780 | 12/1976 | Matsuoka et al. | 280/805 |

Primary Examiner—John J. Love
Assistant Examiner—Donn McGiehan
Attorney, Agent, or Firm—Cushman, Darby & Cushman

[57] ABSTRACT

A seat belt tensioning device which restrains the passenger and absorbs his kinetic energy at an urgent time such as upon an impact of a vehicle. A piston is slidably disposed within a cylinder so as to move in only one direction. Return stop means prevents the piston from moving in an opposite direction. A metallic deformable member is disposed within a cavity of the piston, one end of the member being fixed to the piston, the other end thereof being connected to a seat belt. Piston operating means moves the piston within the cylinder at an urgent time and tensions the seat belt to restrain the passenger. When the tension force applied to the seat belt exceeds the deforming stress value of the metallic deformable member, the member is plastically deformed and the seat belt is drawn out of the cylinder to absorb the kinetic energy of the passenger.

15 Claims, 8 Drawing Figures

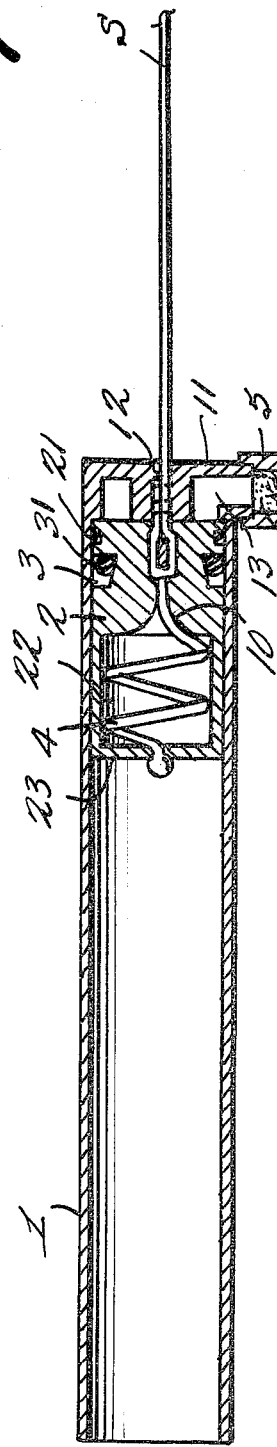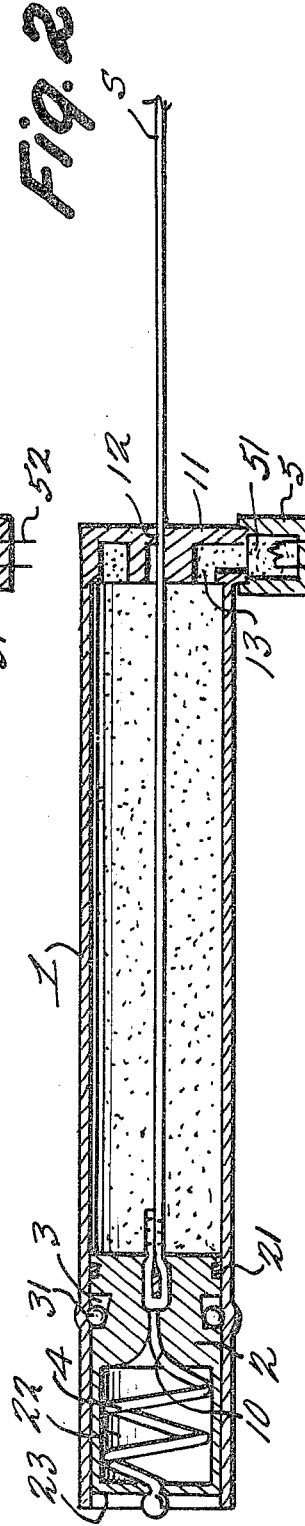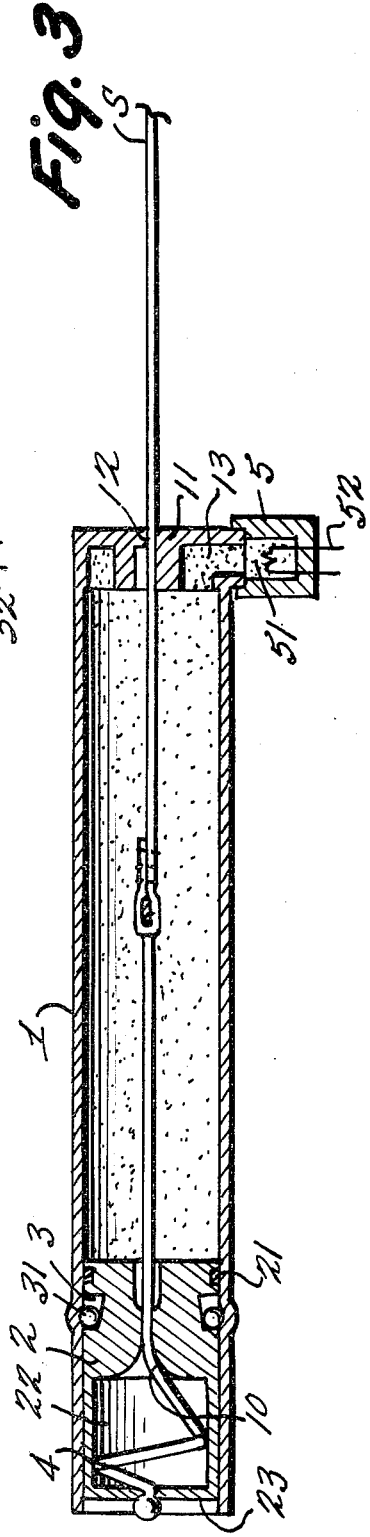

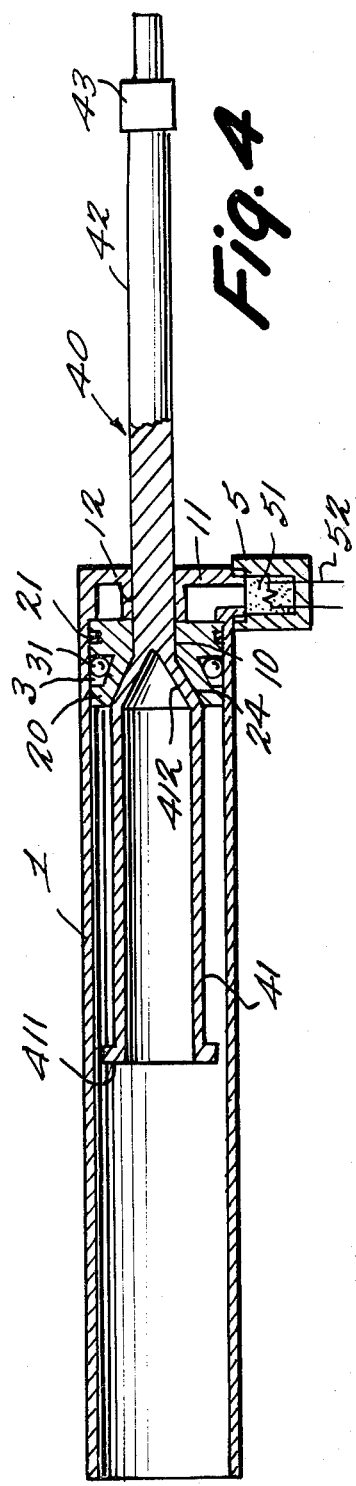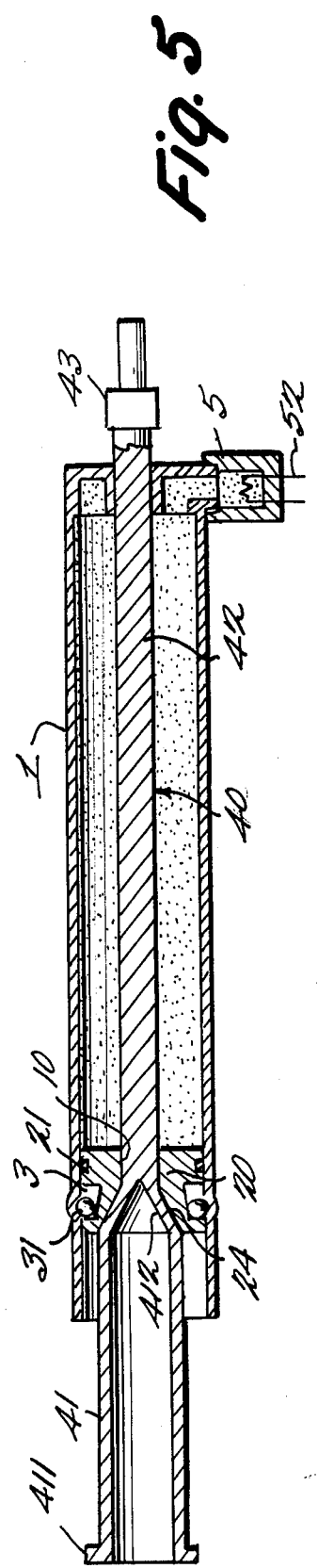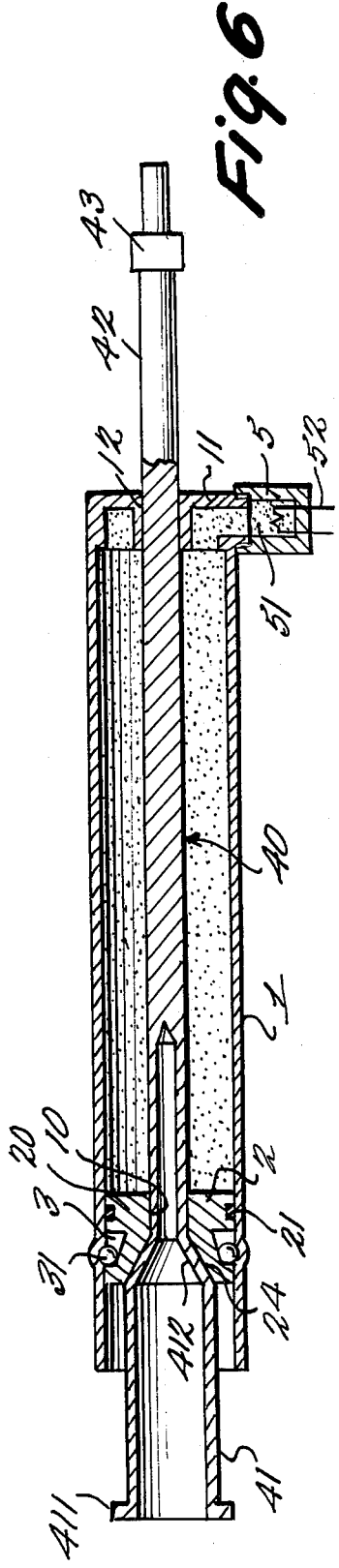

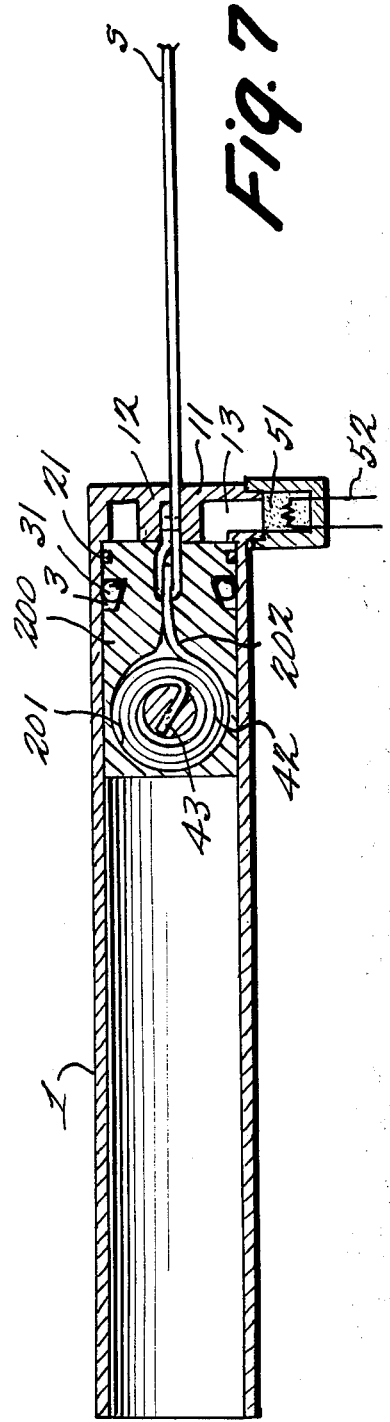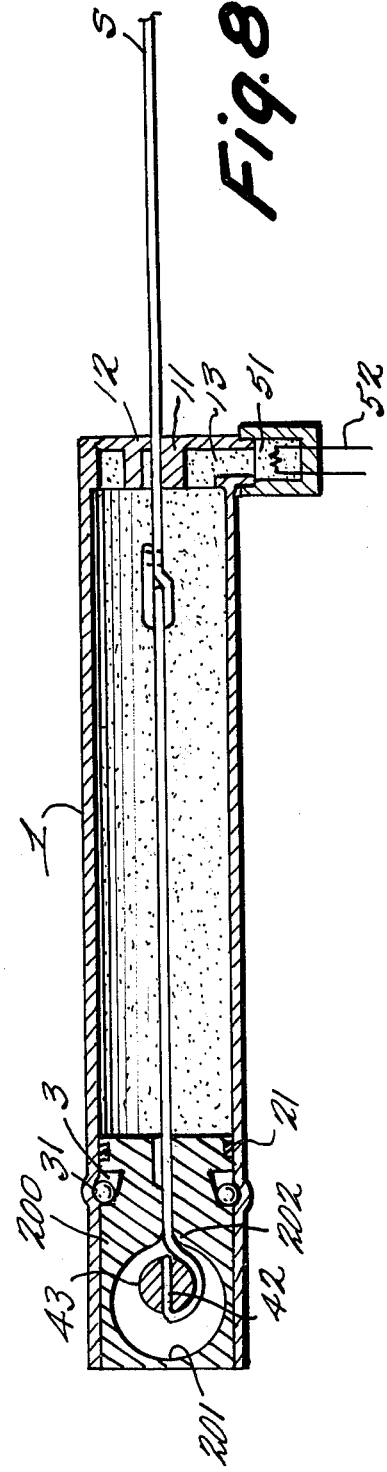

SEAT BELT TENSIONING DEVICE

RELATED APPLICATION

Reference is made to our related copending application Ser. No. 20,045 filed Mar. 13, 1979, and to our priority document, Japanese Application No. 612821/1978, the contents of both of which are incorporated hereinto by reference.

PREAMBLE

The present invention relates to a seat belt tensioning device for use in vehicles such as automobiles, more specifically to a seat belt tensioning device which prevents a passenger from a secondary impact by restraining the passenger by means of a tensioned seat belt at an urgent time such as upon a vehicle impact due to an accident or the like, and prevents the passenger from being injured due to the shock by absorbing kinetic energy of the passenger.

Tensioning devices are installed in seat belts which are stretched over the shoulder, the waist, etc. of a passenger or occupant with a little slack in the normal driving condition of a vehicle.

They prevent him from a secondary impact by tensioning the seat belts and holding him on his seat at an urgent time such as an impact of his vehicle. Since the body of the passenger is fixed to his vehicle firmly through the seat belts, his shock due to the impact can be decreased in some degree by making use of the ride-down effect due to the crush of his vehicle. However, when the shock is very large, he is injured by the tensioned seat belts, since all the large kinetic energy of the passenger which is generated due to the impact cannot be absorbed only by restraining him by seat belts.

Hence, it is desirable to provide seat belts which absorb the kinetic energy of the passenger generated due to the shock at a time of an impact, etc. Various seat belt tensioning devices which absorb the kinetic energy of the passenger as well as tension of the seat belts have been proposed.

One of such devices has a construction that a double cylinder consisting of an inner cylinder and outer cylinder which is engaged with the inner cylinder is provided and a seat belt is tensioned by a piston moving within the inner cylinder disposed within the outer cylinder. When the load applied to the seat belt reaches a predetermined value, the piston and the inner cylinder are locked by a return stop means and then the outer cylinder is plastically deformed by an engaging member formed in an outer periphery of the inner cylinder, relative to the outer cylinder, so that the inner cylinder moves relative to the outer cylinder to absorb the kinetic energy of the passenger.

Tensioning devices effecting a tensioning function and a kinetic energy-absorbing function have generally become too large since it has become difficult to install them in a limited space within a vehicle. Also, the mechanism of such a device has become complex.

In another conventional tensioning device steel balls are provided on an outer periphery of a piston so as to cut into the cylinder when the piston moves in one direction, pulled by the seat belt, to absorb the kinetic energy of the passenger while the cylinder is plastically deformed by the steel balls.

In this device, since the wall of the cylinder must be made thin, there is a problem in that the cylinder wall is easily broken during the deforming process theeof so as not to effect the energy-absorbing function with certainty.

Accordingly, an object of the present invention is to provide a seat belt tensioning device which restrains the passenger on his seat and absorbs his kinetic energy with certainty at an urgent time.

Another object of the present invention is to provide a small-sized seat belt tensioning device having a simple construction for use in automobiles.

Still another object of the present invention is to provide a seat belt safety tensioning device without danger of breaking a cylinder thereof.

Other objects and advantages of the invention will become apparent from the following description of embodiments with reference to the accompanying drawings wherein:

FIGS. 1 to 3 are sectional views of the tensioning device of the first embodiment of the present invention;

FIG. 1 shows a condition of the device before operation; FIG. 2 shows a condition of the device when the tensioning of the seat belt is completed;

FIG. 3 shows a condition of the device when the operation of absorbing the kinetic energy of the passenger is performed;

FIGS. 4 to 6 are sectional views of the tensioning device of the second embodiment of the present invention;

FIG. 4 shows a condition of the device before operation;

FIG. 5 shows a condition of the device when the tensioning of the seat belt is completed;

FIG. 6 shows a condition of the device when the operation of absorbing the kinetic energy of the passenger is performed;

FIGS. 7 and 8 are sectional views of the tensioning device of the third embodiment of the present invention;

FIG. 7 shows a condition of the device before operation; and

FIG. 8 shows a condition of the device when the operation of absorbing the kinetic energy of the passenger is performed.

DETAILED DESCRIPTION OF EMBODIMENTS

Reference is now made to the first embodiment illustrated in FIGS. 1–3. Within a bottomed cylinder 1 which is adapted to be fixed to a floor, roof, etc. in a desired space of a vehicle, a piston 2 is movably disposed for movement in only one direction (leftward in the drawings). Piston 2 is provided with a return stop means 3 in the outer periphery thereof. The return stop means 3 includes steel balls 31 which are supported and confined in a wedge-shape cavity defined by an inwardly inclined surface formed on the outer peripheral surface of the piston and the inner wall of the cylinder.

Piston 2 is prevented from moving rightwardly in the illustrated embodiment by abutment against the cylinder bottom portion 11. However, in another embodiment the piston could be normally disposed in a position slightly to the left of bottom portion 11 and return stop means 3, acting as a stopper, would prevent piston 2 from moving in the rightward direction in FIGS. 1–3 while allowing leftward movement. An O ring 21 is fitted with the inner wall of the cylinder and the outer periphery of piston 2 to effect a seal therebetween.

Piston 2 has an inner cavity 2 wherein a corrugated iron sheet 4 is accomodated as a deformable member.

One end of the iron sheet 4 is fixed to a piston head 23. The other end of the iron sheet extends at least into a passage 10 which is narrower than cavity 22 and passes through an opening in the right end of piston 2 and penetrates the bottom portion 11 of cylinder 1 as hole 12 through which passes seat belt S which connects to deformable sheet 4 at least partially inside piston 2 in the illustration.

A powder chamber 5 is attached to the bottom portion 11 of the cylinder 1, and the powder chamber is communicated with the interior of the cylinder 1 through a cylinder chamber 13 which is provided in the bottom portion 11 of cylinder 1. The powder chamber 5 is charged with a propellant 51 which explodes when electric signals generated in an impact sensor (not shown) are transmitted through a lead wire 52.

In operation, when propellant 51 explodes due to the impact signals at an urgent time such as upon impact of the vehicle, plenty of gas is generated to raise the gas pressure within the cylinder chamber 13. Then the piston 2 is moved to the left of FIGS. 1–3 due to the high pressure gas. At this time, since iron sheet 4 has a deforming stress value larger than the operating force of piston 2, seat belt S is drawn within cylinder 1 together with the piston 2 to restrain the passenger on his seat.

When the passenger is completely restrained by a predetermined high tension force of the seat belt S when piston 2 moves to the left, if a further tension force larger than the operating force of the piston 2 is applied to the seat belt S, return stop means 3 comes into operation. That is, steel balls 31 cut into the inner wall of cylinder 1 and the piston is locked relative to the cylinder 1. As a result, the passenger is completely restrained.

Furthermore, if still more tension force exceeding the deforming stress value of the iron sheet 4 is applied to the seat belt S, the corrugated iron sheet 4 is stretched out or elongated as the seat belt S is drawn out and gradually extended to the right for a substantial but limited distance as shown in FIG. 3.

In this process, the kinetic energy of the passenger is absorbed.

In the first embodiment, seat belt S is directly connected to the iron sheet 4 as a deformable member. However, if seat belt S is made of such a material as to be easily damaged or broken by high pressure gas or heat, it may be connected to the iron sheet 4 indirectly through a rod as in one embodiment disclosed in our above-mentioned copending application. If a rod is used, the air tight condition between the hole 12 penetrating the bottom portion of the cylinder and the rod sliding through the hole 12, is preferably better maintained compared with that in the embodiment illustrated in FIGS. 1–3.

FIGS. 4 to 6 show a second embodiment wherein the same parts as those of the first embodiment are designated by the same reference numerals as those of the first embodiment, and the explanation of the portions common to those of the first embodiment is omitted.

A piston 20 is provided with a return stop means 3 and is disposed within cylinder 1 so as to move in only one direction (to the left in FIGS. 4 to 6). Tightly inserted in a conical cavity 24 of the piston is a conical end portion 412 of a cylindrical body of iron 41, the other end of which is formed to a flange shaped stopper 411. A rod 42 which is formed integrally with the conical end portion 412 is tightly inserted in the narrow passage 10 of the piston 20 and on through hole 12 in cylinder bottom 11 to the exterior. The outer end of rod 42 is connected with the seat belt S by a joint 43. The piston operating means of the second embodiment may be similar to that of the first embodiment.

In the second embodiment, piston 20 is moved to the left by gas pressure due to an explosion of the propellant at an urgent time such as upon an impact of the vehicle. When the tension force of the seat belt reaches a predetermined value, the piston 20 is locked to the cylinder 1 by the return stop means 3. Then, when the tension force applied to the seat belt exceeds the deforming stress value of the iron cylindrical body 41, the conical end portion 412 is squeezed by the piston, and the iron cylindrical body 41 is drawn out or extended to the right a substantial but limited distance as shown in FIG. 6.

Thus, the kinetic energy due to the impact of the passenger against the seat belt is absorbed in this stage.

FIGS. 7 and 8 show the third embodiment of the present invention.

Provided within the piston 200 is an inner cavity 201 having a columnar shape the axis of which is perpendicular to the longitudinal axis of piston 200 and cylinder 1. Rotably accommodated inside cavity 201 is a columnar reel 43 having a diameter larger than the radius of cavity 201. One end of iron sheet 42 is fixed to and wound about the columnar reel 43 and then the iron sheet is curved along a corner portion 202 defined by the inner wall of the piston for forming the cavity 201 and narrow passage 10 in piston 200 in which it is connected to the seat belt S.

In the third embodiment, when a tension force not less than the bending stress value of the iron sheet 42 is applied to the seat belt S, after piston 200 is forcibly moved to the left in FIG. 8 and the tensioning operation of the passenger is completed, reel 43 unwinds due to the pull on iron sheet 42 which continuously bends around corner portion 202 and is drawn out of piston 200 and extended a substantial but limited distance as shown in FIG. 8. The piston is prevented by rightward movement by return stop means 3 as before. As a result, the kinetic energy of the passenger can be absorbed.

Various modifications can be made. For example, an iron wire can be used in place of the iron sheet 42. Furthermore, in the above embodiments of the present invention, propellant is used for operating the piston. Instead, other means of pouring high pressure stored gas into the cylinder at an urgent time, or of making use of a spring, etc. can be used to operate the piston.

Also, by changing the material, shape, etc. of the deformable member, the tensioning load on the passenger and the kinetic energy absorbing characteristic of the seat belt can be freely selected. Likewise, as the means for preventing the return movement of the piston, other conventional suitable means can be used instead of or in addition to the means of cutting steel balls into the cylinder.

As described above, the present invention relates to a seat belt tensioning device comprising a piston slidably disposed in a cylinder in only one direction, an operating means for sliding the piston at an urgent time and a deformable member equipped in the piston which is plastically deformed and thereby moved or elongated in the opposite direction by a predetermined tension force.

The tensioning device of the present invention is of small size, has a simple construction and operates with certainty to prevent the passenger from a secondary impact by restraining him by a predetermined tension force at an urgent time and to decrease his injury as far as possible by absorbing the kinetic energy of him due to the impact. Since the energy-absorbing means of the present invention does not deform the cylinder plastically, there is no danger of breaking the cylinder thereby.

As is apparent from the above, the tensioning device of the present invention can be applied to a seat belt for use in a vehicle, etc. with an excellent practical effect.

Having now fully described several embodiments of the invention, it will be apparent to one of ordinary skill in the art that may additional changes and modifications can be made thereto without departing from the spirit or scope of the invention as set forth herein including the following claims.

What is claimed is:

1. A seat belt tensioning device for a vehicle comprising:
   a cylinder having a piston slidably disposed within said cylinder so as to move in only one direction, said piston having a cavity and a passage which is narrow relative to said cavity and which extends from said cavity in the direction opposite to said one direction, to an opening in said cylinder,
   a member deformable by a predetermined tension force, said member having two ends and being disposed in said cavity, one end of said member being retained by said piston and the other end extending at least into said narrow passage for connection to a seat belt,
   piston operating means for moving said piston in said one direction at an urgent time, and
   return stop means operative after said piston has been moved in said one direction by said operating means for then preventing said piston from moving in said opposite direction for allowing exertion in said opposite direction on said other end of said deformable member of at least said predetermined force to deform said member and move its said other end a substantial distance in said other direction.

2. A tensioning device according to claim 1, wherein said deformable member is a sheet normally having a corrugated shape and is drawn out of said cavity through said narrow passage into an elongated shape by said predetermined force.

3. A tensioning device according to claim 1, wherein said other end of said member includes a rod tightly interposed in said narrow passage and said one end of said deformable member includes a hollow cylindrical body having a conical end portion integral with said rod and disposed in said piston cavity tightly in said opposite direction,
   said cylindrical body being sequeezable through said narrow passage by said predetermined force.

4. A tensioning device according to claim 1 wherein said cavity is formed by a wall which has a corner portion at the entrance to said narrow passage,
   said deformable member includes a swirl shaped element which is bent by said corner portion at its exit into said passage and which is drawn out of said cavity while being bent at said corner portion into an elongated shape by said predetermined force.

5. A tensioning device as in claim 4 wherein said cavity has a columnar shape with a columnar axis perpendicular to said one and opposite directions.

6. A tensioning device as in claim 4 or 5 wherein said member is a swirl shaped sheet.

7. A tensioning device as in claim 6 wherein said sheet is metallic.

8. A tensioning device as in claims 4 or 5 wherein said element is a wire.

9. A tensioning device as in claims 1, 2, 3, 4 or 5 wherein said member is metallic.

10. In a vehicle seat belt tensioning device, the improvement comprising:
    actuable means for tensioning a seat belt, when actuated, by pulling the seat belt in a given direction,
    said actuable means including a cylinder having a piston movable in only said given direction and means for forcibly moving said piston in said given direction for tightening said belt upon vehicle impact, and
    energy absorbing means for allowing the seat belt to move a sufficient distance in the opposite direction to absorb kinetic energy applied to the seat belt as a result of a vehicle impact,
    said energy absorbing means including deformable means connectable to said seat belt and movable as a unit with said piston in said given direction and having a predetermined deformation stress value which, when exceeded by a seat belt force pulling in said opposite direction in response to said applied kinetic energy, causes the deformable means to deform and thereby move relative to said piston in said opposite direction to allow seat belt movement in said opposite direction to absorb said kinetic energy.

11. A seat belt tensioning device comprising:
    a cylinder having a piston movable in only one direction for tightening a seat belt in an emergency,
    means for forcibly moving said piston in said one direction to cause said emergency tightening, and
    deformable means connectable to said seat belt and having a predetermined deforming stress value and movable as a unit in said one direction with said piston,
    said deformable means being extendable in an opposite direction a substantial distance upon deformation by a force exceeding said deforming stress value.

12. A tensioning device as in claim 10 or 11 wherein said deformable means includes a member having a nonlinear shape which is drawn out into an elongated shape by said force.

13. A tensioning device as in claim 12 wherein said nonlinear shape is a corrugated shape.

14. A tensioning device as in claim 12 wherein said nonlinear shape is a swirl shape.

15. A tensioning device as in claim 10 or 11 wherein said deformable means includes a rod of given cross-sectional dimension deformable to a lesser value by said force pulling on said rod in said opposite direction relative to said piston.

* * * * *